US012237503B2

(12) United States Patent
Chen et al.

(10) Patent No.: US 12,237,503 B2
(45) Date of Patent: Feb. 25, 2025

(54) PREPARATION METHOD OF A ZINC-CARBON COMPOSITE ELECTRODE MATERIAL USED IN ZINC ION ENERGY STORAGE DEVICE

(71) Applicant: HAINAN UNIVERSITY, Hainan (CN)

(72) Inventors: Yong Chen, Hainan (CN); Chen Chen, Hainan (CN)

(73) Assignee: HAINAN UNIVERSITY, Hainan (CN)

( * ) Notice: Subject to any disclaimer, the term of this patent is extended or adjusted under 35 U.S.C. 154(b) by 636 days.

(21) Appl. No.: 17/594,477

(22) PCT Filed: Jun. 28, 2021

(86) PCT No.: PCT/CN2021/102703
§ 371 (c)(1),
(2) Date: Oct. 18, 2021

(87) PCT Pub. No.: WO2022/179018
PCT Pub. Date: Sep. 1, 2022

(65) Prior Publication Data
US 2023/0223524 A1    Jul. 13, 2023

(30) Foreign Application Priority Data
Feb. 25, 2021  (CN) .......................... 202110211151.1

(51) Int. Cl.
*H01M 4/38*   (2006.01)
*H01M 4/02*   (2006.01)
(Continued)

(52) U.S. Cl.
CPC ............. *H01M 4/38* (2013.01); *H01M 4/043* (2013.01); *H01M 4/0471* (2013.01);
(Continued)

(58) Field of Classification Search
CPC ...... H01M 4/38; H01M 4/043; H01M 4/0471; H01M 4/623; H01M 4/625; H01M 4/669;
(Continued)

(56) References Cited

U.S. PATENT DOCUMENTS

2004/0191622 A1*  9/2004  Han ..................... H01M 50/119
                                                                            429/174
2012/0135297 A1*  5/2012  Zhang .................. H01M 4/621
                                                                            429/162

FOREIGN PATENT DOCUMENTS

CN      101948130       *   1/2011
CN      105870384       *   8/2016
(Continued)

*Primary Examiner* — Lisa S Park
(74) *Attorney, Agent, or Firm* — JEEN IP LAW, LLC

(57) ABSTRACT

A preparation method of zinc-carbon composite electrode material for zinc ion energy storage device, which includes preparing a zinc-carbon composite negative electrode material, preparing an electrode paste, and preparing a battery electrode; the zinc-carbon composite negative electrode material provided in the present invention can enhance a capacity of the zinc ion energy storage device, enhance a cycle stability of the device, has strong expandability, significantly improves the performance of the zinc ion energy storage device, increases the energy density and prolong the service life, and is easy to be popularized on a large scale.

6 Claims, 2 Drawing Sheets

(51) Int. Cl.
*H01M 4/04* (2006.01)
*H01M 4/62* (2006.01)
*H01M 4/66* (2006.01)
*H01M 4/74* (2006.01)
*H01M 10/04* (2006.01)
*H01M 10/054* (2010.01)
*H01M 10/36* (2010.01)
*H01M 50/126* (2021.01)

(52) U.S. Cl.
CPC ........... *H01M 4/623* (2013.01); *H01M 4/625* (2013.01); *H01M 4/669* (2013.01); *H01M 4/74* (2013.01); *H01M 10/0427* (2013.01); *H01M 10/054* (2013.01); *H01M 10/36* (2013.01); *H01M 2004/021* (2013.01); *H01M 2004/027* (2013.01)

(58) Field of Classification Search
CPC .. H01M 4/74; H01M 10/0427; H01M 10/054; H01M 10/36; H01M 2004/021; H01M 2004/027; H01M 4/134; H01M 4/364; H01M 4/366; H01M 4/0404; H01M 4/1395; H01M 4/42; H01M 4/622; Y02E 60/10; H01G 11/86; H01G 11/30; H01G 11/42
See application file for complete search history.

(56) References Cited

FOREIGN PATENT DOCUMENTS

| | | | |
|---|---|---|---|
| CN | 106219602 | * | 12/2016 |
| CN | 107317015 | * | 11/2017 |
| CN | 110364692 | * | 10/2019 |

* cited by examiner

PREPARATION METHOD OF A ZINC-CARBON COMPOSITE ELECTRODE MATERIAL USED IN ZINC ION ENERGY STORAGE DEVICE

FIELD OF THE INVENTION

The present invention relates to the field of electrode materials, and in particular to a preparation method of a zinc-carbon composite electrode material for a zinc ion energy storage device.

BACKGROUND OF THE INVENTION

Pure zinc foil is commonly used as a negative electrode in common Aqueous zinc ion batteries and zinc ion capacitors. However, the pure zinc foil negative electrode is expensive and prone to side reactions and dendrite growth on the surface, thus having the problems of unstable electrochemical performance and short service life. If a power density of the device is to be further increased or the device is to be cycled in a longer period, a formation of zinc dendrites and inert by-products under high current stimulation or after multiple cycles becomes an important problem that can not be ignored.

Moreover, the formation of zinc dendrites will increase a surface area of negative electrode and increase a hydrogen evolution rate; a hydrogen evolution reaction on the negative electrode surface will increase a concentration of $OH^-$ and cause the local pH value to change, and these generated $OH^-$ will participate in the reaction and form electrochemically inert corrosion by-products deposited on the negative electrode surface; the inert corrosion by-products on the negative electrode surface can lead to an uneven surface and aggravate an electrode polarization, which in turn promotes the formation of dendrites. Therefore, an emergence of a large number of the zinc dendrites may lead to the formation of a vicious circle that reduces the life and capacity of devices.

BRIEF SUMMARY OF THE INVENTION

In view of this, provided is the preparation method of the zinc-carbon composite electrode material for the zinc ion energy storage device.

The technical solution of the present invention is realized as follows: the preparation method of the zinc-carbon composite electrode material for the zinc ion energy storage device, comprising:

S1, preparing the zinc-carbon composite negative electrode material: grinding zinc powder particles and powdered carbon additive materials, the grinding being a mechanical grinding or a manual grinding, after grinding, putting a sample in a vacuum drying cabinet and drying at a drying temperature of 100° C. to 130° C. with a drying time of 2 to 8 hours to obtain the zinc-carbon composite negative electrode material;

S2, preparing an electrode paste: evenly mixing the zinc-carbon composite negative electrode material and polytetrafluoroethylene (PTFE) in proportion, with a mass ratio of the zinc-carbon composite negative electrode material being 85% to 95%, and a mass ratio of the polytetrafluoroethylene being 5% to 15%, and obtaining the electrode paste;

S3, pressing the electrode paste into a thin sheet with a thickness of 150 µm to 300 µm and putting into an electric thermostatic drier for drying at a drying temperature of 60° C. to 120° C. with a drying time of 1 to 8 hours;

S4, cutting the thin sheet into a disc with a diameter of 8 mm to 12 mm by a sheet-punching machine, and moving it into the vacuum drying cabinet for drying at a drying temperature of 100° C. to 130° C. with a drying time of 10 to 15 hours; and S5, pressing the dried disc onto a stainless steel mesh current collector and using it as a button battery.

Further, the carbon additive material and the zinc powder material in step S1 account for 1-10% and 90-99% of a mass of the electrode paste except for a binder, respectively.

Further, the carbon additive in step S1 is a powdered carbon material or a carbon powder dispersion liquid, wherein the powdered carbon material has a particle size of 10 nm to 200 µm, and comprises ketjen black, acetylene black, biochar, graphite carbon, graphene and carbon nanotubes.

Further, a purity of the pure zinc powder in step S1 is higher than 90%, a morphology of which is spherical particles or spherical-like particles, and the zinc powder material has a particle size of 1 µm to 30 µm.

Further, a ball-to-powder ratio used in the mechanical grinding in step S1 is 20:1.

Further, in step S1, the mechanical grinding is performed by a planetary ball mill, a ball milling speed is controlled at 200 to 600 rpm, and a grinding time is 2 to 4 hours.

Further, a grinding time of the manual grinding in step S1 is 10 to 180 minutes.

Compared with the prior art, the present invention has the beneficial effects that: the zinc-carbon composite negative electrode material provided in the present invention can enhance a capacity of the zinc ion energy storage device and enhance a cycle stability of the device. The zinc powder can be used to provide an electrochemical activity basis for the energy storage device, and a cost of zinc powder is much lower than that of the pure zinc foil; after being assembled into a zinc ion hybrid capacitor, the used zinc-carbon composite electrode can provide a first cycle discharge specific capacity of 308.75 F/g, and maintain a capacity of 85.83% after 500 times of 1 A/g constant current charge and discharge tests;

In addition, the method has a simple preparation process and strong expandability, significantly improves the performance of the zinc ion energy storage device, increases energy density and prolong service life, and is easy to be popularized on a large scale.

BRIEF DESCRIPTION OF THE FIGURES

In FIG. 2, KB@Zn—1% is a cyclic performance comparison graph of the zinc-carbon composite electrode-activated carbon capacitor in Example 1 at different current densities.

In FIG. 2, KB@Zn—10% is a cyclic performance comparison graph of the zinc-carbon composite electrode-activated carbon capacitor in Example 2 at different current densities.

In FIG. 2, AC@Zn—10% is a cyclic performance comparison graph of the zinc-carbon composite electrode-activated carbon capacitor in Example 3 at different current densities.

DETAILED DESCRIPTION OF THE INVENTION

Figure 1:
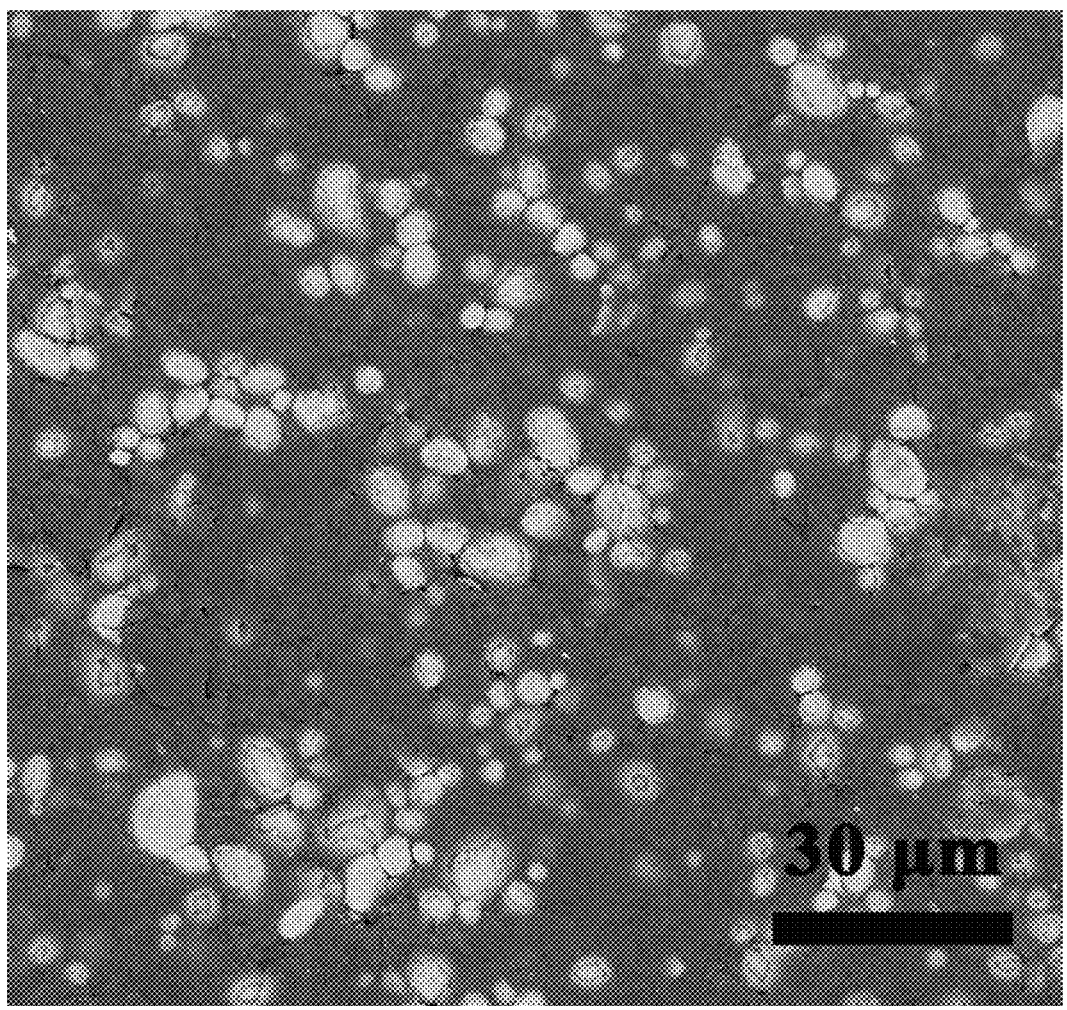
FIG. 1 is a scanning electron micrograph of the zinc-carbon composite electrode obtained in Example 2 of the present invention.

In order to help better understand the technical content of the present invention, specific embodiments are provided below to further explain the present invention.

The experimental methods used in the example of the present invention are conventional methods unless otherwise specified.

The materials, reagents and the like used in the examples of the present invention are commercially available unless otherwise specified.

Embodiment 1

The preparation method of the zinc-carbon composite electrode material for the zinc ion energy storage device, comprising:
- S1, preparing the zinc-carbon composite negative electrode material: grinding the zinc powder particles and the powdered carbon additive materials; the carbon additive material and the zinc powder material accounting for 1% and 94% of the mass of the electrode paste except for the binder, respectively; the carbon additive material being ketjen black with a particle size of 10 nm; the zinc powder being a spherical-like particle with a particle size of 1 μm; the grinding being a manual grinding with a grinding time of 10 minutes; after grinding, putting the sample in the vacuum drying cabinet and drying at a drying temperature of 100° C. with a drying time of 2 hours to obtain the zinc-carbon composite negative electrode material;
- S2, preparing the electrode paste: evenly mixing the zinc-carbon composite negative electrode material and polytetrafluoroethylene (PTFE) in proportion, with a mass ratio of the zinc-carbon composite negative electrode material being 85%, and a mass ratio of the polytetrafluoroethylene being 15%, and obtaining the electrode paste;
- S3, pressing the electrode paste into a thin sheet with a thickness of 150 and putting into the electric thermostatic drier for drying at a drying temperature of 60° C. with a drying time of 1 hour;
- S4, cutting the thin sheet into a disc with a diameter of 8 mm by the sheet-punching machine, and moving them into the vacuum drying cabinet for drying at the drying temperature of 100° C. with a drying time of 10 hours; and
- S5, pressing the dried disc onto the stainless steel mesh current collector and using it as the button battery, and assembling a CR2025 button battery together with a pole piece of activated carbon positive electrode material and a 2M zinc sulfate solution to test the electrochemical performance.

Embodiment 2

The preparation method of the zinc-carbon composite electrode material for the zinc ion energy storage device, comprising:
- S1, preparing the zinc-carbon composite negative electrode material: grinding the zinc powder particles and the powdered carbon additive materials, the carbon additive material and the zinc powder material accounting for 10% and 90% of the mass of an electrode paste except for the binder, respectively; the carbon additive material being ketjen black with a particle size of 200 μm; the zinc powder being a spherical-like particle with a particle size of 30 μm; the grinding being a manual grinding with a grinding time of 180 minutes; after grinding, putting the sample in the vacuum drying cabinet and drying at a drying temperature of 130° C. with a drying time of 8 hours to obtain the zinc-carbon composite negative electrode material;
- S2, preparing the electrode paste: evenly mixing the zinc-carbon composite negative electrode material and polytetrafluoroethylene (PTFE) in proportion, with a mass ratio of the zinc-carbon composite negative electrode material being 95%, and a mass ratio of the polytetrafluoroethylene being 5%, and obtaining the electrode paste;
- S3, pressing the electrode paste into a thin sheet with a thickness of 300 and putting into the electric thermostatic drier for drying at a drying temperature of 120° C. with a drying time of 8 hours;
- S4, cutting the thin sheet into the disc with the diameter of 8 mm to 12 mm by the sheet-punching machine, and moving it into the vacuum drying cabinet for drying at the drying temperature of 120° C. with a drying time of 15 hours; and
- S5, pressing the dried disc onto the stainless steel mesh current collector and using it as the button battery, and assembling the CR2025 button battery together with the pole piece of activated carbon positive electrode material and the 2M zinc sulfate solution to test the electrochemical performance.

Embodiment 3

The preparation method of the zinc-carbon composite electrode material for the zinc ion energy storage device, comprising:
- S1, preparing the zinc-carbon composite negative electrode material: grinding the zinc powder particles and the powdered carbon additive materials; the carbon additive material and the zinc powder material accounting for 10% and 90% of the mass of v electrode paste except for the binder, respectively; the carbon additive material being biochar with a particle size of 100 μm; the zinc powder being a spherical-like particle with a particle size of 25 μm; the grinding being a planetary ball mill grinding with a ball milling speed of at 400 rpm and a drying time of 3 hours; after grinding, putting the sample in the vacuum drying cabinet and drying at the drying temperature of 120° C. with the drying time of 8 hours to obtain the zinc-carbon composite negative electrode material;
- S2, preparing the electrode paste: evenly mixing the zinc-carbon composite negative electrode material and polytetrafluoroethylene (PTFE) in proportion, with a mass ratio of the zinc-carbon composite negative electrode material being 95%, and a mass ratio of the polytetrafluoroethylene being 5%, and obtaining the electrode paste;
- S3, pressing the electrode paste into a thin sheet with a thickness of 200 and putting into the electric thermostatic drier for drying at the drying temperature of 120° C. with the drying time of 8 hours;

S4, cutting the thin sheet into the disc with a diameter of 10 mm by the sheet-punching machine, and moving it into the vacuum drying cabinet for drying at the drying temperature of 120° C. with the drying time of 8 hours; and S5, pressing the dried disc onto the stainless steel mesh current collector and using it as the button battery, and assembling the CR2025 button battery together with the pole piece of activated carbon positive electrode material and a 2M zinc sulfate solution to test the electrochemical performance.

Figure 2:
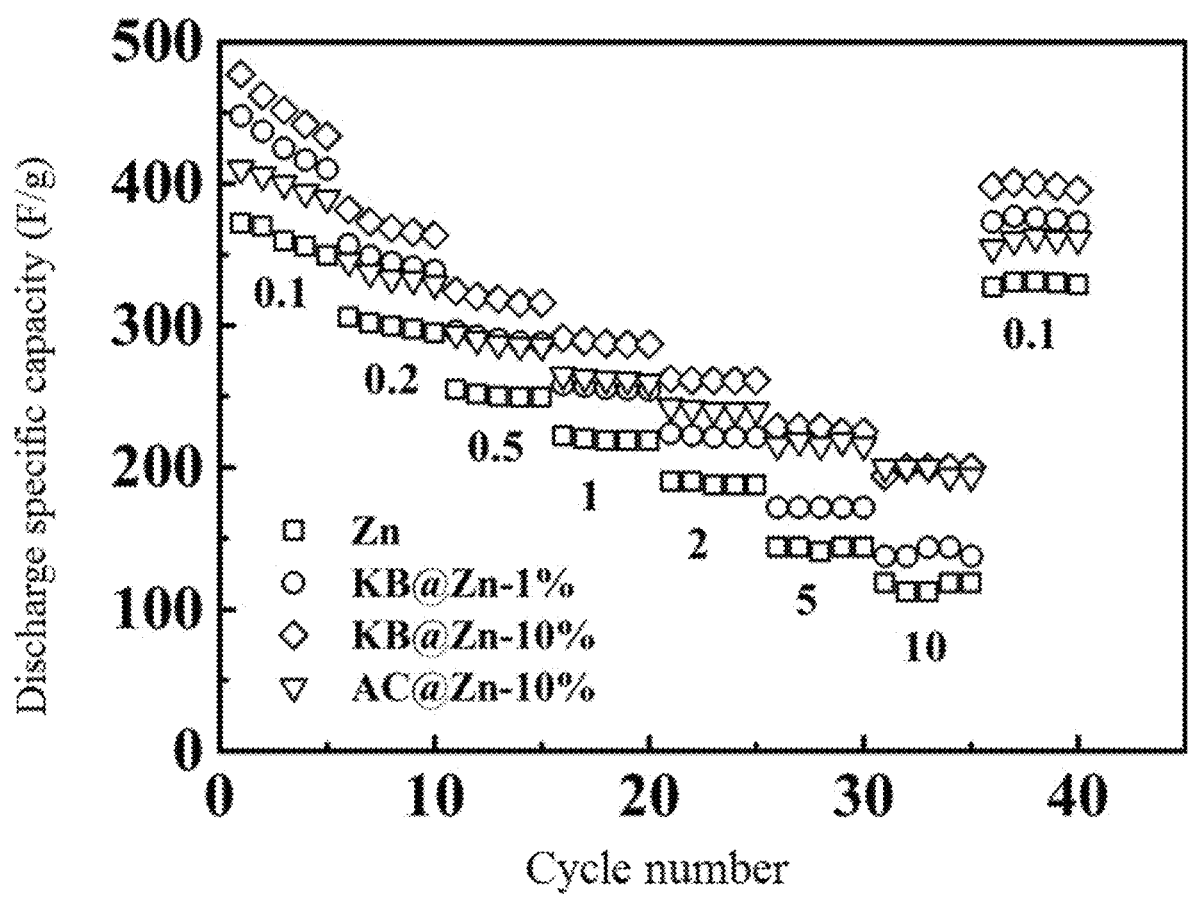
In FIG. 2, Zn is a cyclic performance comparison graph of pure zinc foil-activated carbon capacitor used for comparison at different current densities.

Table 1 shows the test results of constant current charge and discharge cycles obtained by cycling four samples in FIG. 2 for 500 cycles at a current density of 1 A/g

TABLE 1

| Sample category | Initial discharge capacity F/g | Residual capacity after 500 cycles F/g | Capacity maintenance ratio |
|---|---|---|---|
| Zn | 228.75 | 185.16 | 80.94% |
| KB@Zn-1% | 285.00 | 238.75 | 83.78% |
| KB@Zn-10% | 308.75 | 265.00 | 85.83% |
| AC@Zn-10% | 306.25 | 261.25 | 85.30% |

As shown in Table 1, the zinc-carbon composite negative electrode material provided in the present invention can enhance the capacity of the zinc ion energy storage device and enhance the cycle stability of the device. After being assembled into the zinc ion hybrid capacitor, the pure zinc electrode for comparison can provide a first cycle discharge specific capacity of 228.75 F/g, and maintain a capacity of 80.94% after 500 times of 1 A/g constant current charge and discharge tests. After being assembled into the zinc ion hybrid capacitor, the zinc-carbon composite electrode used in Example 1 of the present invention can provide a first cycle discharge specific capacity of 285 F/g, and maintain a capacity of 83.78% after 500 times of 1 A/g constant current charge and discharge tests; After being assembled into the zinc ion hybrid capacitor, the zinc-carbon composite electrode used in Example 2 of the present invention can provide a first cycle discharge specific capacity of 308.75 F/g, and maintain a capacity of 85.83% after 500 times of 1 A/g constant current charge and discharge tests; After being assembled into the zinc ion hybrid capacitor, the zinc-carbon composite electrode used in Example 3 of the present invention can provide a first cycle discharge specific capacity of 306.25 F/g, and maintain a capacity of 85.30% after 500 times of 1 A/g constant current charge and discharge tests;

The above descriptions are merely the preferred embodiments of the present invention and are not intended to limit the present invention; any modification, equivalent replacement, improvement, etc. made within the spirit and principles of the present invention should be included in the scope of protection of the present invention.

What is claimed is:

1. A preparation method of a zinc ion energy storage device, comprising:
   S1, preparing a zinc-carbon composite negative electrode material: grinding zinc powder particles and a powdered carbon additive material; the grinding being a mechanical grinding or a manual grinding; after grinding, putting a combination of ground zinc powder particles and a ground powdered carbon additive material in a vacuum drying cabinet and drying at a drying temperature of 100° C. to 130° C. with a drying time of 2 to 8 hours to obtain the zinc-carbon composite negative electrode material;
   S2, preparing an electrode paste: evenly mixing the zinc-carbon composite negative electrode material and polytetrafluoroethylene, with a mass ratio of the zinc-carbon composite negative electrode material being 85% to 95%, and a mass ratio of the polytetrafluoroethylene being 5% to 15%, and obtaining the electrode paste; wherein, the electrode paste consists of a binder and the zinc-carbon composite negative electrode material; the zinc-carbon composite negative electrode material consists of the ground zinc powder particles and the ground powdered carbon additive material; the ground powdered carbon additive material in the step S1 account for 1-10% of a mass of the electrode paste except for the binder; the ground zinc powder particles in the step S1 account for 90-99% of the mass of the electrode paste except for the binder; and the polytetrafluoroethylene serves as the binder;
   S3, pressing the electrode paste into a thin sheet with a thickness of 150 μm to 300 and putting the thin sheet into an electric thermostatic drier for drying at the drying temperature of 60° C. to 120° C. with the drying time of 1 to 8 hours;
   S4, cutting the thin sheet into a disc with a diameter of 8 mm to 12 mm by a sheet-punching machine, and moving the disc into the vacuum drying cabinet for drying at the drying temperature of 100° C. to 130° C. with the drying time of 10 to 15 hours; and
   S5, pressing the disc dried in step S4 onto a stainless steel mesh current collector and using the stainless steel mesh current collector in a button battery.

2. The preparation method of the zinc ion energy storage device as described in claim 1, wherein the powdered carbon additive material in step S1 is a powdered carbon material or a carbon powder dispersion liquid; the powdered carbon material has a particle size of 10 nm to 200 μm, and comprises a ketjen black, an acetylene black, a biochar, a graphite carbon, a graphene, and carbon nanotubes.

3. The preparation method of the zinc ion energy storage device as described in claim 1, wherein a purity of the zinc powder particles in step S1 is higher than 90%; the zinc powder particles are substantially spherical particles, and the zinc powder particles has a particle size of 1 μm to 30 μm.

4. The preparation method of the zinc ion energy storage device as described in claim 1, wherein a ball-to-powder ratio used in the mechanical grinding in step S1 is 20:1.

5. The preparation method of the zinc ion energy storage device as described in claim 1, wherein in step S1, the mechanical grinding is performed by a planetary ball mill with a ball milling speed of 200 to 600 rpm, and a grinding time of 2 to 4 hours.

6. The preparation method of the zinc ion energy storage device as described in claim 1, wherein grinding time of the manual grinding in step S1 is 10 to 180 minutes.

* * * * *